(12) United States Patent
Gahm et al.

(10) Patent No.: US 9,215,182 B2
(45) Date of Patent: *Dec. 15, 2015

(54) ENHANCING PERFORMANCE OF RAPID CHANNEL CHANGES AND OTHER PLAYBACK POSITIONING CHANGES IN ADAPTIVE STREAMING

(71) Applicant: Cisco Technology, Inc., San Jose, CA (US)

(72) Inventors: Joshua B. Gahm, Newtownville, MA (US); Eric Cunningham, Boxborough, MA (US); Ali C. Begen, London (CA); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,688

(22) Filed: Dec. 16, 2014

(65) Prior Publication Data
US 2015/0098327 A1    Apr. 9, 2015

Related U.S. Application Data

(63) Continuation of application No. 13/895,822, filed on May 16, 2013, now Pat. No. 8,953,452.

(51) Int. Cl.
*H04L 1/00* (2006.01)
*H04L 12/823* (2013.01)
*H04L 12/917* (2013.01)
(Continued)

(52) U.S. Cl.
CPC .............. *H04L 47/32* (2013.01); *H04L 47/263* (2013.01); *H04L 47/30* (2013.01); *H04L 47/38* (2013.01); *H04L 47/6275* (2013.01); *H04L 47/76* (2013.01); *H04L 65/4084* (2013.01); *H04L 65/80* (2013.01); *H04N 21/47217* (2013.01); *H04L 41/5025* (2013.01)

(58) Field of Classification Search
CPC ..... H04L 47/32; H04L 47/76; H04L 47/6275; H04L 41/5025; H04L 47/38; H04L 47/263; H04L 47/30; H04L 65/4084; H04L 65/80; H04N 21/47217
See application file for complete search history.

(56) References Cited

U.S. PATENT DOCUMENTS 6,493,386 B1    12/2002    Vetro et al.
6,542,546 B1    4/2003    Vetro et al.
(Continued)

OTHER PUBLICATIONS

Adobe Systems Incorporated, "Flexible delivery of on-demand and live video streaming," 2011, 3 pages, http://www.adobe.com/products/httpdynamicstreaming/.
(Continued)

*Primary Examiner* — Clemence Han
(74) *Attorney, Agent, or Firm* — Edell, Shapiro & Finnan, LLC (57) ABSTRACT

Content is received within a network at a content receiver and that is communicated from a content source, where the content comprises packets to be sent to the content receiver that are marked with a first drop priority or a second drop priority. A network priority is detected at the content receiver that is based at least in part upon a ratio of packets marked with the first drop priority to packets marked with the second drop priority within the content and also a determination at the content receiver of a rate of packets dropped that are marked with the first drop priority and a rate of packets dropped that are marked with the second drop priority.

20 Claims, 7 Drawing Sheets

(51) Int. Cl.
*H04L 12/865* (2013.01)
*H04L 12/811* (2013.01)
*H04L 12/825* (2013.01)
*H04L 12/835* (2013.01)
*H04L 29/06* (2006.01)
*H04N 21/472* (2011.01)
*G06F 15/16* (2006.01)
*H04L 12/24* (2006.01)

(56) References Cited

U.S. PATENT DOCUMENTS

2012/0254457 A1* 10/2012 Condon et al. ............... 709/231
2012/0265856 A1 10/2012 Major et al.
2013/0067109 A1* 3/2013 Dong et al. ............... 709/231
2013/0160058 A1* 6/2013 Albal et al. ............... 725/62
2013/0282917 A1* 10/2013 Reznik et al. ............... 709/231

OTHER PUBLICATIONS

Pantos, R., "http Live Streaming," Informational Internet Draft, Nov. 19, 2010, 23 pages, http://tools.ietf.org/html/draftpantos-http-live-streaming-05.

International Search Report and Written Opinion corresponding to PCT/US2014/033440, dated Oct. 6, 2014, 7 pages.

N. Aboobaker, D. Chanady, M. Gerla, and M.Y. Sanadidi: "Streaming Media Congestion Control Using Bandwidth Estimation", Oct. 2002, pp. 89-100, XP002729808, Retrieved from the Internet: URL:http://download.springer.com/static/pdf/68/bok%253A978-3-540-45812-8.pdf?auth66=1411819113_7a8646b1c88dea40792f9c2b7eb00e3a&ext=.pdf.

* cited by examiner

ENHANCING PERFORMANCE OF RAPID CHANNEL CHANGES AND OTHER PLAYBACK POSITIONING CHANGES IN ADAPTIVE STREAMING

CROSS-REFERENCE TO RELATED APPLICATION

This application is a continuation of U.S. application Ser. No. 13/895,822, filed May 16, 2013, the entirety of which is incorporated herein by reference.

TECHNICAL FIELD

This disclosure relates in general to the field of communications and, more particularly, to techniques associated with adaptive streaming and improving media quality and user experience of media playout during a certain period in which a client buffer is being filled with media segments.

BACKGROUND

Hypertext Transfer Protocol (HTTP) adaptive streaming (HAS) clients are designed to provide the best quality experience to end users by exploiting the greedy nature of TCP's flow and congestion control capabilities. In HAS, the video content is encoded at several bitrates with associated quality levels, where each quality level is broken up into segments (often referred to as chunks or fragments as well) usually between two and ten seconds. This gives the client the ability to choose a quality level based on measurements of the available bandwidth on the path between the client and server and revise this decision as the network bandwidth changes or fluctuates. There may also be other factors that might affect client's decisions.

When starting to fetch a new video stream (e.g., following a channel change, a playback position change or a fast forward/rewind operation), the client has to manage a fundamental tradeoff between beginning playback quickly, presenting "high quality" video and building a sufficient playout buffer depth to prevent player stalls in the event of a drop in network bandwidth.

DETAILED DESCRIPTION OF EXAMPLE EMBODIMENTS

Overview

Techniques are described herein for receiving content within a network at a content receiver that is communicated from a content source based upon fetch requests by the content receiver, wherein the fetch requests for content are based upon a first adaptation logic scheme to fill a buffer of the content receiver at a selected rate and to download segments of content at selected encoding rates, detecting a network priority at the content receiver, wherein the network priority comprises an observed download rate at the content receiver that is greater than a fair share rate considering other content receivers in the network, and revising fetch requests for content in response to detection of the network priority, wherein the revised fetch requests are based upon a priority adaptation scheme that results in at least one of filling the buffer at a faster rate and downloading segments of content at higher encoding rates in relation to the first adaptation logic scheme.

Example Embodiments

There are two fundamental states that a traditional HAS (HTTP adaptive streaming) client switches between during a streaming session, a buffer-filling mode and a steady-state mode. In a buffer-filling mode, the client's playback buffer is not full and it fetches segments from a content server as fast as possible (or at least faster than the playout rate) to fill the buffer. In a steady-state mode, the client has a full buffer and throttles downloading to maintain but not exceed the maximum buffer size. The HAS client is challenged with the task of implementing a suitable adaptation logic scheme that maximizes user experience with the streaming video in the initial buffer-filling mode while having very little information about the available network bandwidth.

Some useful techniques for assisting HAS clients in a buffer-filling mode are to use differential packet drop probabilities utilizing, e.g., Weighted Random Early Detection (WRED) techniques as described herein, to provide HAS clients in a buffer-filling mode with an advantage over competing clients that may have full or nearly full buffers (e.g., HAS clients in steady-state mode). In particular, a priority can be given to certain HAS clients by shifting a small amount of bandwidth from a large pool of clients currently in a steady-state mode to a smaller group of clients in the buffer-filling mode. The intent of this bandwidth shift is to relax the tradeoff between fast, high-quality initial video playback and the risk of a rebuffering event. Thus, these techniques generate a certain unfairness or advantage to HAS clients in a buffer-filling mode.

Some example techniques for assigning a priority or advantage to HAS clients in a buffer-filling mode are described in further detail herein. However, while the assigned priority or advantage to a HAS client can be useful, it would be of even greater benefit for a HAS client to obtain an indication of an actual advantage received. This is due to the fact that, for various reasons, the actual advantage provided to the HAS client may differ from the assigned advantage.

In the present disclosure, example techniques are first described for assigning priorities to HAS clients within a network using WRED techniques. Following this, techniques are described for actual advantage detection within the network, where such techniques enable a HAS client to determine whether and to what extent an assigned or expected advantage is being realized and further how much bandwidth the HAS client is likely to receive when the requested priority is no longer in force.

Assigning Priority to Clients Based Upon WRED Techniques

An example system for enabling adaptive streaming of video content in accordance with techniques described herein is described with reference to FIG. 1A. A communication system 10 includes a plurality of servers or content sources 12, a plurality of media storages 14, a network 16, a plurality of clients or content receivers 18a-c, and a plurality of routers 20. Content source 12 is configured to deliver requested content to content receivers 18a-c. The content may include any suitable information and/or data that can propagate in the network, where such information may be stored in media storage 14, which can be provisioned anywhere in the network. Media storage 14 may be a part of content source, connected to content source, suitably accessed using network 16, etc. Each of the content sources 12, media storages 14, content receivers 18a-c and routers 20 can include any one or more suitable memory storage devices that may include one or more of read only memory (ROM), random access memory (RAM), magnetic disk storage media devices, optical storage media devices, flash memory devices, electrical, optical, or other physical/tangible memory storage devices, and any combinations thereof. One or more of the memory storage devices can be encoded with software comprising computer executable instructions that facilitate control of operations associated with the techniques as described herein.

Communication system 10 can be configured to provide downloading and streaming capabilities associated with data services. Communication system 10 can also offer the ability to manage content for mixed-media offerings, which may combine video, audio, games, applications, channels, and programs into digital media bundles. In one particular instance, communication system 10 may be configured to reduce stream start-up delay for adaptive streaming by redirecting scarce bandwidth from streams that have adequate playback buffer depth to fill their buffers more slowly (without stalling). By reducing the bandwidth to some streams, extra bandwidth may be provided to streams starting up.

More specifically, a distribution source can use a combination of in-network traffic management, content receiver-based adaptation algorithms, and server traffic classifications to reduce the initial buffering time. These can be achieved without introducing problematic pathologies into the system such as unfair operation, inabilities to achieve an optimal rate mix among content receivers, congestion collapsing of network elements, etc. Communication system 10 can operate in either "over-the-top" or "managed" environments. One example case may involve a degree of cooperation and mutual trust among content receivers. Another example case may leverage ancillary system elements such that content receivers can be authenticated, authorized, and suitably monitored to detect and prevent cheating as discussed below.

For purposes of illustrating certain example techniques of communication system 10, it is important to understand the communications that may be traversing the network. The following foundational information may be viewed as a basis from which the present disclosure may be properly explained. Adaptive streaming video systems make use of multi-rate video encoding and an elastic IP transport protocol suite (typically hypertext transfer protocol/transmission control protocol/Internet protocol (HTTP/TCP/IP or HTTP/SPDY/TCP/IP)) to deliver high quality streaming video to a multitude of simultaneous users under widely varying network conditions. While examples described herein are based upon the use of TCP protocol, it should be understood that the techniques can also be applied to any transport protocol which comprises TCP Friendly Rate Control (TFRC), including, for example, SCTP and DCCP. These systems are typically employed for "over-the-top" video services, where neither the network paths nor the quality of service over those paths can be controlled by the source or the sink. However, because of their ubiquity and flexibility, they are also being used for managed video services, where the network is carefully traffic engineered and the content receivers and servers are sized for the load.

In HTTP adaptive streaming, the source video is encoded such that the same content is available for streaming at a number of different rates (this can be via either multi-rate coding, such as H.264 AVC, or layered coding, such as H.264 SVC). The video can be divided into segments of one or more groups-of-pictures (GOP); typically two (2) to ten (10) seconds of length. Content receivers can access segments stored on servers (or produced in near-real time for "live" streaming) using a Web paradigm (e.g., HTTP GET operations over a reliable stream transport), and depend on the reliability, congestion control, and flow control features of that transport for data delivery. Content receivers can indirectly observe the performance of the streaming fetch operations by monitoring the delivery rate and/or the fill level of their buffers and, further, either upshift to a higher encoding rate to obtain better quality when bandwidth is available, or downshift in order to avoid buffer underruns and the consequent video stalls when available bandwidth decreases.

Compared to inelastic systems such as classic cable TV or broadcast services, adaptive streaming systems use significantly larger amounts of buffering to absorb the effects of varying available bandwidth in the network. They also typically operate in a "greedy" mode by competing with each other and with other network traffic for available bandwidth. Because of the need to avoid stalls, the initial buffering period can be long when a new stream is started, or when a forward or backward skip in the content happens; this can be several seconds or longer when congestion occurs.

In accordance with one example implementation of the present disclosure, communication system 10 can resolve the aforementioned issues (and potentially others) associated with reducing stream start-up delay for adaptive streaming. Content receivers, servers (e.g., content source 12), and the network cooperate to shift bandwidth from streams already rendering video, including those operating in steady-state mode and those with a full-enough buffer to upshift to a higher-rate encoding, to those just starting to render video and in a buffer-filling mode. When the network is under-loaded, the new streams can ramp up quickly without depleting the buffers of other content receivers. However, when the network is heavily loaded, these streams would slow down (due to TCP congestion control dynamics).

In an example embodiment, Weighted Random Early Detection (WRED) techniques are provided that use differential drop priorities (e.g., a Diffserv QoS capability), where routers supporting Diffserv (e.g., routers 20) have a number of service classes (within each of which, packets can be assigned varying levels of drop priority). Under light load, all the packets are forwarded, but under congestion conditions, routers drop packets with a higher drop priority within a given traffic class in preference to those with a lower drop priority. Since the streams can be HAS streams (e.g., using HTTP/TCP/IP or HTTP/SPDY/TCP/IP as the protocol suite), this causes the TCP connections with outstanding packets of higher drop priority to see losses and reduce their congestion window size. This effectively cuts their bandwidth usage, which in turn opens up capacity that can be absorbed by the streams running at lower drop priority. These streams, seeing more available bandwidth, speed up through normal TCP dynamics. Using multiple drop priorities within a single service class is quite different from methods that put packets of the same stream in different service classes. TCP can interact poorly with multiple service classes on a single connection, as mis-ordering introduced by multiple service classes can result in TCP misidentifying this as loss and, further, cause a large drop in the effective throughput of the TCP connections.

In an example WRED embodiment, packets for various stream segments are transmitted by a server at different drop priorities based on a stream state at the content receiver. For example, Diffserv classes can allow three drop priorities per class. There are a number of possible mappings of stream state to drop priority and the mappings can vary based on how many drop priorities are available.

In one WRED example, where three drop priorities are available, the first drop priority may be chosen strictly based on content receiver buffer fullness. When the buffer is less than one-third (⅓) full, the server transmits packets at the lowest drop priority. When the buffer is between one-third (⅓) to two-thirds (⅔) full, the server transmits packets at the intermediate drop priority. When the buffer is more than two-thirds (⅔) full, the highest drop priority is used. In another embodiment, two drop priorities may be used. In other embodiments, more than three drop priorities may be used without departing from the scope of the present disclosure.

In another WRED example, drop priorities are chosen based on a stream state assessment at the content receiver. If the content receiver is initially filling its buffer and has not yet started rendering video, the server transmits packets at the lowest drop priority. Once the content receiver starts rendering video and has some degree of "breathing room" in its buffer, the server transmits packets at the intermediate drop priority. Once the content receiver has built up a substantial buffer and is continuing to obtain more bandwidth than needed to sustain the current encoding rate (and might upshift to a higher encoding rate), the server transmits packets at the highest drop priority.

In a further WRED example, drop priorities are statistically chosen by the server (e.g., content source 12) on a packet-by-packet basis selecting among the available drop priorities based on a weight value that depends on the buffer state of the content receiver. For example, a weight value, "w", is a number between zero (0) and one (1), which represents the fraction of packets to be sent using the high drop priority (e.g., by designating certain high drop priority packets as "Best Effort" or BE class as described herein), with the remaining packets being sent at the low drop priority (e.g., by designating certain low drop priority packets as "Low Drop" or LD class as described herein). The weight value can be calculated based on the buffer fullness of the content receiver, with a weight of zero (0) being used when the buffer is empty, a weight of one (1) being used when the buffer is full, and intermediate values of "w" being used for intermediate levels of buffer fullness. In addition to using fewer drop priorities than the other embodiments discussed herein, this technique provides the advantage that the average bandwidth seen by the content receiver becomes a continuous function of its buffer fullness rather than a step function. Smoothing the relationship between buffer fullness and bandwidth, in turn, may make a content receiver's rate adaptation algorithms more stable.

The overall effect of assigning drop priorities is that new stream starts are given an "extra bandwidth boost" when load is high by having packet drops concentrated on streams that have the most "headroom" to slow down without risk of draining their buffers too much. When there is enough load to fill the available bandwidth (under steady state), the process has the effect of keeping all the streams at or near the midpoint of their buffering space, penalizing streams that "get ahead" and go into a buffering region where an upshift might occur, and preferring streams whose buffers are depleted (as well as those building up their initial buffers). While not entirely "flow fair" in the TCP sense, the scheme provides a more useful form of stream fairness.

Given that HAS streaming systems put all adaptation policy at the content receivers rather than the servers, content receiver signaling of the stream state may be used. In an embodiment, the content receivers signal to the server as part of each segment fetch transaction. For example, the content receivers signal their buffer depth in terms of a buffer fullness (e.g., a percentage of buffer fullness or an absolute value of buffer fullness). A server could then map this metric into the corresponding drop priority and transmits all packets of the requested segment at that drop priority.

In another example, the content receivers signal their stream state as one of three conditions. The first condition is an initial fill, both pre-rendering and initial building phase up to the point of safety against stall, or emptying faster than the current encoding rate and considering a downshift to avoid a stall. The second condition is a steady state with adequate buffering at the current encoding rate. The third condition is above a buffer midpoint and filling faster than the current stream rate, such that the content receiver is considering a rate upshift.

After receiving the stream state condition, the server maps the stream states onto a corresponding low, medium, or high drop priority and subsequently transmits all packets of the requested segment at the corresponding drop priority. For example, the first condition may be a low drop priority, the second condition may be a medium drop priority, and the third condition may be a high drop priority.

In addition, there are a number of possible methods that fit into the existing HTTP/TCP adaptive streaming protocols for the content receivers to signal the necessary information to the server. For example, the data may be signaled as uniform resource locator (URL) parameters together with the URL for the requested segment. In another example, the data may be signaled in an HTTP header extension. In another example, the data is signaled in a multipurpose Internet mail extension (MIME) object included with the HTTP GET request.

In an embodiment, there are some ways that a purely server-based approach can assess the content receiver buffering state and choose appropriate per-segment drop priorities. Such methods may be effective by employing heuristics that can be used individually, or in combination with each other. For example, initial segment(s) of a given piece of content can be assigned the lowest drop priority on the assumption that they are likely to constitute a new stream start. Conversely, high encoding rates can be assigned the highest drop priority based on the assumption that only content receivers operating with significant bandwidth and plentiful buffering would ask for those rates.

In another example, segments of the lowest encoding rate can be assigned to the lowest drop priority based on the assumption that content receivers that are either starting a new stream or skipping forward/backward would drop to the lowest encoding rate. Also, content receivers newly arrived on a server (i.e., these are the first segments being requested on the server) would receive a low drop priority based on the assumption that content receivers have reasonably strong server affinity and, further, are not doing parallel fetches from multiple (uncoordinated) servers. This may allow the server to build up a "model" of the content receiver's buffer state by tracking fetch requests and assigning drop priorities based on that model.

When content receivers using the scheme are in the same traffic class and compete only among themselves (or with traffic that is not biased in some way with respect to drop priority), the process works well. However, content receivers should not be permitted to cheat by providing misinformation about their buffering state, or otherwise convincing the server to use a lower drop priority than the content receiver should obtain. If all content receivers cheat in this manner, the system reverts to the behavior it would have employed if drop priorities were not used in the first place (since the only useful cheat for a content receiver is to cause the server to use the lowest drop priority). If some content receivers cheat and others do not, there is unfair behavior that favors the cheating content receivers.

The system can be configured such that a cheating content receiver can be mostly avoided through conventional authentication and authorization techniques. For example, if servers refuse to set drop priorities for content receivers who cannot pass authorization checks, content receivers not known to "play by the rules" (i.e., adhere to the protocol) can be excluded. If a content receiver manages to pass authorization checks and still misbehaves and attempts to cheat, there are various techniques that can be used to monitor and report such misbehavior, such as access logs, in-network monitoring of traffic by routers, anomaly detection software, etc. For example, content receiver 18a may be known to give false information about its buffer state and, as a result, content source 12 may refuse to set low drop priorities for content receiver 18a.

Turning to the example infrastructure associated with present disclosure, content receivers 18a-c can be associated with devices, customers, or end users wishing to receive data or content in communication system 10 via some network. The term 'content receiver' is inclusive of devices used to initiate a communication, such as a receiver, a computer, a set-top box, an Internet radio device (IRD), a cell phone, a smart phone, a tablet, a personal digital assistant (PDA), a Google droid, an iPhone, and iPad, or any other device, component, element, or object capable of initiating voice, audio, video, media, or data exchanges within communication system 10. Content receivers 18a-c may also be inclusive of a suitable interface to the human user, such as a display, a keyboard, a touchpad, a remote control, or other terminal equipment. Content receivers 18a-c may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Network 16 represents a series of points or nodes of interconnected communication paths for receiving and transmitting packets of information that propagate through communication system 10. Network 16 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and data over cable service interface specification (DOCSIS) cable television (CATV). The architecture of the present disclosure may include a configuration capable of transmission control protocol/internet protocol (TCP/IP) communications for the transmission and/or reception of packets in a network.

Figure 1A:
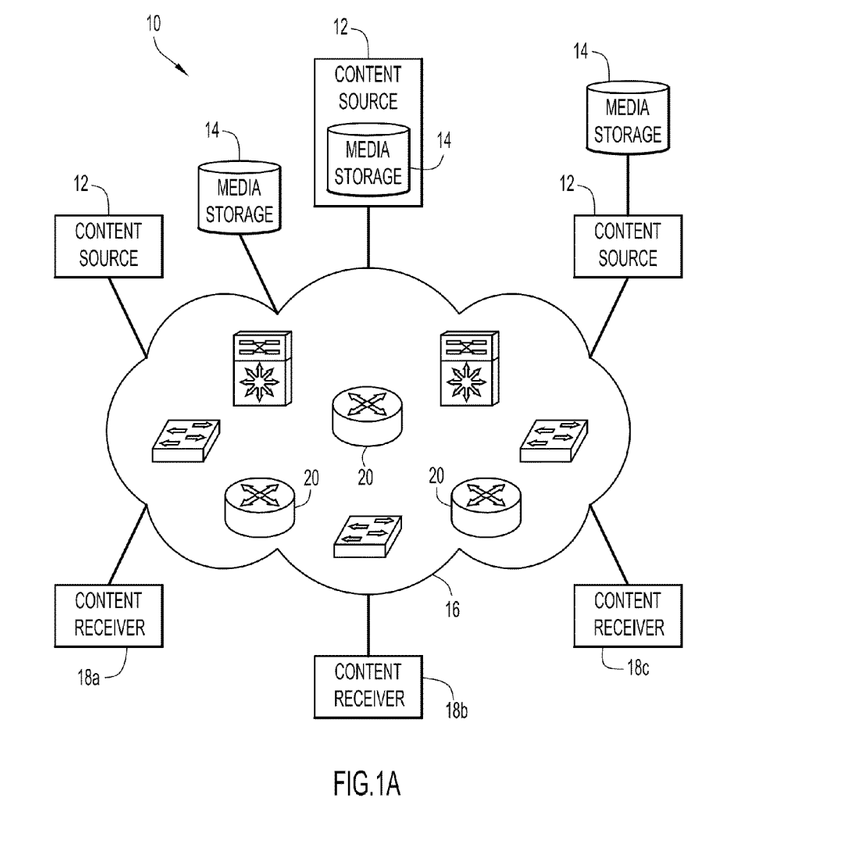
FIG. 1A is a simplified block diagram of a communication system to reduce stream start-up delay for adaptive streaming in accordance with one embodiment of the present disclosure.
Figure 1B:
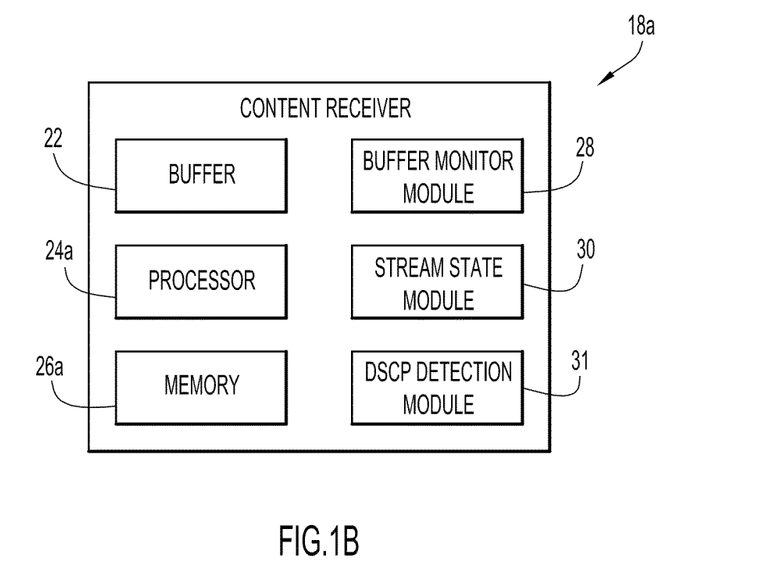
FIG. 1B is a simplified block diagram illustrating possible example details associated with one embodiment of the present disclosure.

Turning to FIG. 1B, FIG. 1B is a simplified block diagram illustrating one possible set of details associated with communication system 10. This particular configuration includes content receiver 18a. In this particular implementation, content receiver 18a includes a buffer 22, a processor 24a, a memory 26a, a buffer monitor module 28, a stream state module 30, and a DSCP detection module 31. Buffer 22 can be configured to buffer content received at a receiver (e.g., receiver 18a). Buffer monitor module 28 can be configured to monitor buffer 22, determine a status of buffer 22 (possibly for separate media tracks if available), and/or determine a weight factor for buffer 22 (e.g., based upon a fullness value of the buffer depth which is associated with a weight factor "w"). Stream state module 30 can be configured to monitor the state of the content stream that the receiver (e.g., receiver 18a) is receiving and determine whether or not the content is rendering. The DSCP detection module can be configured to monitor information that is generated within its TCP receiver stack in relation to received and dropped packets during fetching requests for segments of content and playout of a content stream.

Figure 1C:
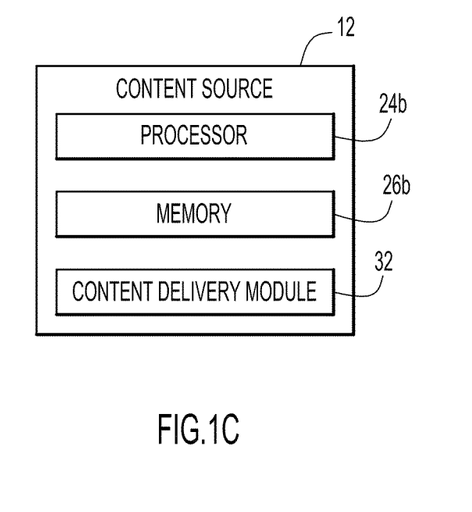
FIG. 1C is a simplified block diagram illustrating possible example details associated with one embodiment of the present disclosure.

Turning to FIG. 1C, FIG. 1C is a simplified block diagram illustrating one possible set of details associated with communication system 10. This particular configuration includes content source 12. In this particular instance, content source 12 includes a processor 24b, a memory 26b, and a content delivery module 32. Content delivery module 32 can be configured to determine the drop priorities of packets sent to content receivers 18a-c, as discussed herein.

Content receivers 18a-c and content source 12 are network elements that can facilitate the streaming activities discussed herein. As used herein in this Specification, the term 'network element' is meant to encompass any of the aforementioned elements, as well as routers, switches, cable boxes, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, content receivers 18a-c and/or content source 12 include software to achieve (or to foster) the streaming activities discussed herein. This could include the implementation of instances of buffer monitor module 28, stream state module 30, and/or content delivery module 32. Additionally, each of these elements can have an internal structure (e.g., a processor, a memory element, etc.) to facilitate some of the operations described herein. In other embodiments, these streaming activities may be executed externally to these elements, or included in some other network element to achieve the intended functionality. Alternatively, content receivers 18a-c and content source 12 may include software (or reciprocating software) that can coordinate with other network elements in order to achieve the streaming activities described herein. In still other embodiments, one or several devices may include any suitable algorithms, hardware, software, components, modules, interfaces, or objects that facilitate the operations thereof.

Figure 2:
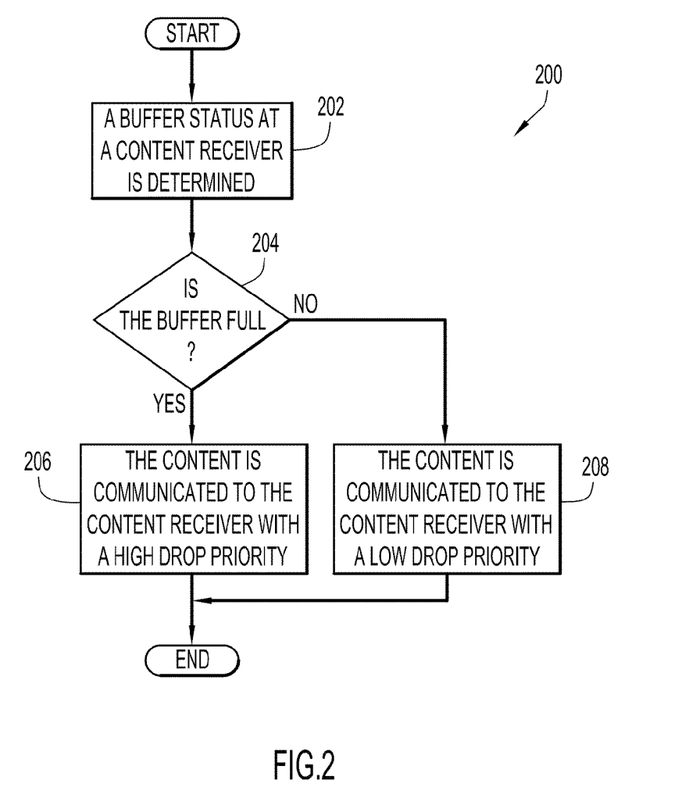
FIG. 2 is a simplified flowchart illustrating potential operations associated with the communication system in accordance with one embodiment of the present disclosure.

Turning to FIG. 2, FIG. 2 is a simplified flowchart 200 illustrating example activities associated with assigning priority during HTTP adaptive streaming based upon the buffer status of the content receiver. At 202, a buffer status at a content receiver is determined. For example, the status of buffer 22 at content receiver 18a may be determined by buffer monitor module 28. At 204, the system determines if the buffer is full. For example, buffer monitor module 28 may determine if buffer 22 is full. If the buffer is nearly full, then the content is sent to the content receiver in which packets are marked with a high drop priority, as illustrated in 206. For example, content receiver 18a may send a signal to content source 12 that buffer 22 is nearly full. In response, content delivery module 32 may place a high drop priority for packets of content being delivered to content receiver 18a.

If the buffer is not close to full, then the content is communicated to the content receiver with packets being marked with a low drop priority. For example, content receiver 18a may send a signal to content source 12 that the buffer is not full. In response, content delivery module 32 may place a low drop priority on packets of content being delivered to content receiver 18a.

Figure 3:
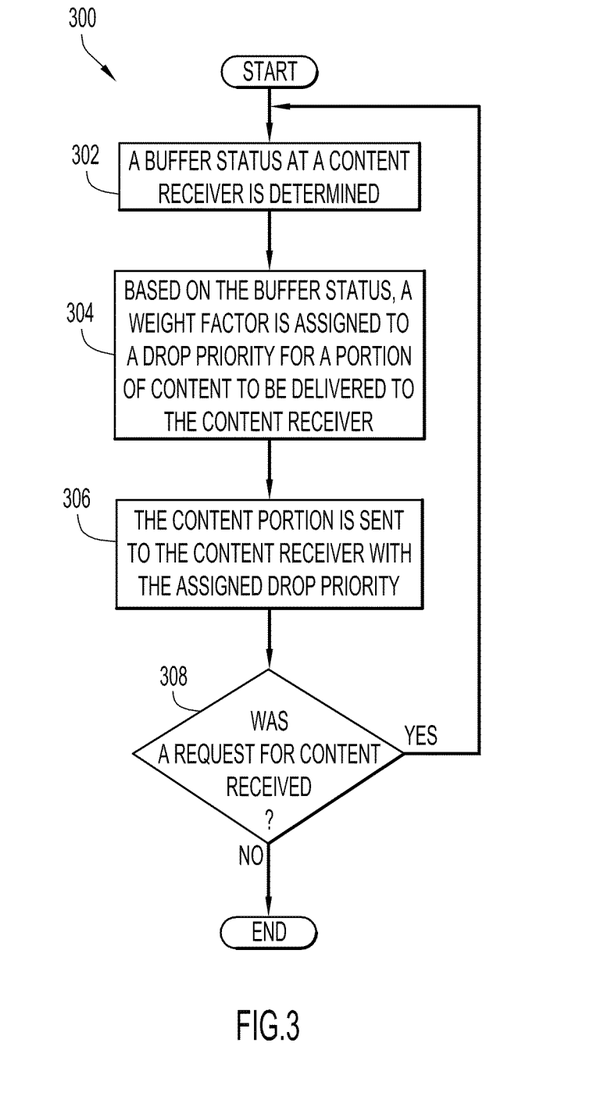
FIG. 3 is another simplified flowchart illustrating potential operations associated with the communication system in accordance with one embodiment of the present disclosure.

Turning to FIG. 3, FIG. 3 is a simplified flowchart 300 illustrating example activities associated assigning weight factors to drop priorities based upon the buffer status of a content receiver during adaptive streaming. At 302, a buffer status at a content receiver is determined. For example, the status of buffer 22 at content receiver 18a may be determined by buffer monitor module 28. At 304, based on the buffer status, a weight factor is assigned to a drop priority for a portion of packets of content to be delivered to the content receiver. For example, based on the buffer status, buffer monitor module 28 may assign a weight factor "w" to the drop priority. In another example, buffer monitor module 28 may determine an indicator value associated with the buffer depth (e.g., an absolute value of buffer fullness).

At 306, the content portion can be sent to the content receiver in which packets are marked with the assigned drop priority. For example, content delivery module 32 may receive the weight factor from content receiver 18a and use the weight factor to assign a drop priority to the content portion that is sent to the content receiver. In another example, content delivery module 32 uses the indicator value of the buffer depth to determine the drop priority. At 308, the system determines if all of the content has been delivered to the content receiver. If the content has been delivered to the content receiver, then the flow ends. If not all of the content has been delivered to the content receiver, then the buffer status at the content receiver is determined, as illustrated in 302, and the flow continues.

Figure 4:
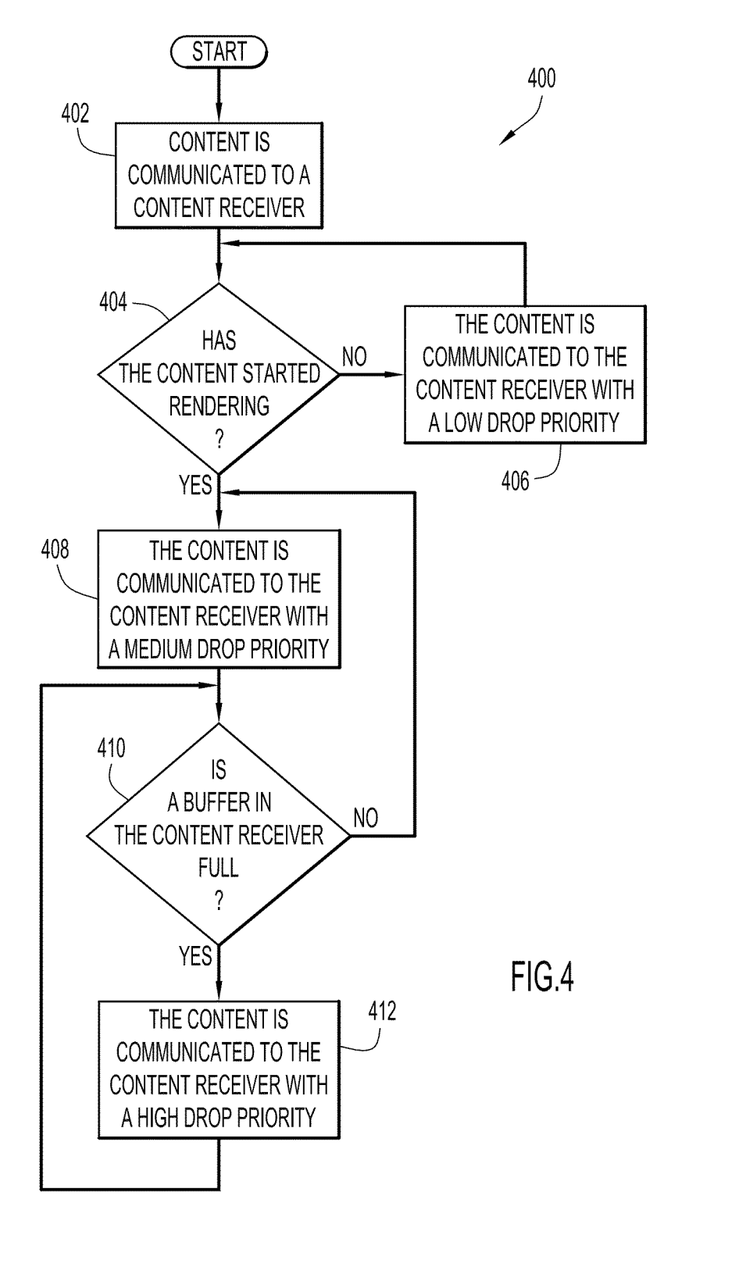
FIG. 4 is another simplified flowchart illustrating potential operations associated with the communication system in accordance with one embodiment of the present disclosure.

Turning to FIG. 4, FIG. 4 is a simplified flowchart 400 illustrating example activities associated with reducing stream start-up delay for adaptive streaming. At 402, content is communicated to a content receiver. For example, content may be communicated to content receiver 18a from content source 12. At 404, the system determines if the content has started rendering. For example, stream state module 30 may determine if the content on content receiver 18a has started rendering.

If the system determines that the content on the content receiver has not started rendering, then the content is communicated to the content receiver with a low drop priority, as illustrated in 406. If the system determines that the content on the content receiver has started rendering, then the content is communicated to the content receiver with a medium drop priority, as illustrated in 408. At 410, the system determines if a buffer in the content receiver is full. For example, buffer monitor 28 may determine if buffer 22 is full. If the buffer is not full, then the content is communicated to the content receiver with a medium drop priority, as illustrated in 408. If the buffer is full, then the content is communicated to the content receiver with a high drop priority, as illustrated in 412, and the system determines if the buffer content is full, as illustrated in 410.

Thus, the previously described WRED techniques assign priorities to content receivers based upon the current buffer status of the receivers. It is noted that, in certain example embodiments, priorities are assigned to content receivers based upon both the buffer status of a content receiver and a defined start-up condition in which a new content stream is being requested by the content receiver, such as a recent channel change or a seek (e.g., fast forward or rewind). When a content receiver has sufficiently filled its buffer, its advantage diminishes and cannot be increased without a modification to its defined start-up condition (e.g., without another channel change or a fast forward/rewind operation). In other words, a content receiver cannot be allowed to reclaim or gain an advantage based upon a change in its buffer status that is based solely upon changing network conditions, since the advantage is intended to be granted for start-up conditions only. However, in other example embodiments, the advantage or priority can be set based upon buffer status without consideration of any start-up condition (i.e., priority/advantage may be granted based upon buffer status at any time for a content receiver, whether or not the content receiver is in a start-up condition).

Advantage Detection Techniques for Client Discovery of Realized Advantage

While the techniques previously described herein are useful in assigning priorities to clients or content receivers based upon the current buffer status of the content receivers (e.g., indicating whether each content receiver is in a buffer-filling mode or a steady-state mode or varying levels of buffer fullness, and assigning an advantage or network priority accordingly), the benefits of such priority assignment will be enhanced based upon the techniques described herein when the content receiver is made aware of the extent to which any such priority assignment is actually being realized.

In particular, it is important for a content receiver to detect any actual or realized network advantage or network priority it is being granted at any given time, since there are several network conditions that can occur that can impact any network advantage to which a content receiver may be entitled based upon priority assignment techniques of the types described herein. As used herein, the terms "advantage", "priority" and "network priority" refer to a priority or advantage that may be assigned to (e.g., anticipated) or actually realized by a content receiver. The term "drop priority" relates to a drop priority assigned to a packet for a content stream as described herein.

Some examples of network conditions that may affect a network priority or advantage assigned to a content receiver include:

1. The network is not under congestion and thus would not be dropping packets (so no priority or advantage is established).

2. The network is misconfigured. A number of possible scenarios can result in a network misconfiguration, such as if the server or content source is marking packets properly but WRED is misconfigured.

3. WRED is not configured at a current bottleneck (e.g., a node or location within the network in which bandwidth or data throughput is limited). Bottlenecks can occur at different locations based upon network conditions at any given time, including bottleneck locations where WRED is not enabled or configured.

4. Packets are getting re-marked within the network.

5. The server or content source is misconfigured and may be marking packets in a manner not expected by the content receiver.

The techniques described herein enable a client/content receiver to determine the actual magnitude received at the client side of any granted network advantage in view of conditions that may affect network operations.

In HAS systems such as depicted in FIG. 1A, a content receiver 18a, 18b, 18c typically implements an adaptation scheme that selects an appropriate quality level for the next video segment to be fetched from a content source 12 based upon a running average of previously downloaded segment download rates. Through observation, a content receiver (e.g., utilizing its stream state module 30), attempts to measure a network fair share, FS, defined in the following manner:

$$FS = T/n$$

where T is the throughput of an inferred bottleneck link (e.g., a link in the video stream path from content source to content receivers that provides the least throughput), and n is the number of content receivers sharing this link. The content receivers select a quality level for fetching the next segment based upon an estimate of this fair share. In order to utilize a granted priority most effectively, the techniques described herein allow content receivers to determine an accurate FS value at any time based upon a granted network advantage to a content receiver. This allows a content receiver to utilize any granted network advantage efficiently while not upshifting beyond a fair share profile.

In an example embodiment, WRED techniques are enabled for a bottleneck link in which two service classes are assigned to packets, a "Best Effort" or BE class and a "Low Drop" or LD class. The LD class is defined as having a greater minimum drop threshold in relation to the BE class, meaning that packets will not be dropped from the LD class until the queue length in the router sending packets to the bottleneck link exceeds this minimum drop threshold. The assigning of packets as BE packets or LD packets within a video stream for a content receiver can be based upon the priority assigned to the content receiver (e.g., a content receiver having an assigned priority/advantage that is higher than another content receiver would have more packets marked as LD packets in relation to the other content receiver for the same video stream). Under normal congestion conditions, all dropped packets within a bottleneck are packets marked as BE class in the Differentiated Services Code Point (DSCP) value for each packet (since BE packets have a lower minimum drop threshold in relation to LD packets). However, when congestion conditions are greater than normal, or when other conditions occur (e.g., misconfigurations such as those previously described), both BE and LD packets might be dropped (thus altering any assigned advantage a content receiver may have been granted within the network). Conversely, when there is little or no congestion at the bottleneck link, few or no packets may be dropped from either the BE or the LD class, again altering the advantage that the content receiver receives from its expected value.

The determination of the magnitude or extent of any granted advantage to a client/content receiver can be made in relation to a WRED technique as previously described herein that utilizes a weight value, "w", to represent a fraction of packets to be sent using a high drop priority (where such packets are classified as BE packets), and the remaining packets are sent with a low drop priority (such packets are classified as LD packets). While the advantage detection is described herein as being made on the client side, it is noted that advantage detection (including detection of the magnitude of the detected advantage) can also be implemented on one or more of the client side, the server side and/or at any other suitable node or location within the network. In addition, advantage detection techniques can be utilized in relation to WRED techniques in which a priority or advantage is only assigned to a content receiver based upon its buffer status and based upon a defined start-up condition (e.g., channel change to a new content stream, or a fast forward/rewind operation of a content stream), such that any reduction in advantage or priority granted to a content receiver cannot be reclaimed (i.e., advantage or priority cannot be increased) without changing the start-up condition (cannot increase a granted priority or advantage to a content receiver without a channel change or fast forward/rewind operation). The advantage detection techniques can also be utilized in relation to WRED techniques in which a priority or advantage is assigned to a content received based upon buffer status without consideration of any start-up condition.

A weight value "w" can be set for the marking ratio of LD to BE packets based upon any suitable criteria. For example, a content receiver may request marking ratio of LD to BE packets based on a buffer status (e.g., buffer depth) or any other selected criteria. In another example embodiment, a weight value or other priority value can be assigned to a content receiver based upon any selected criteria that indicate the content receiver is at a start-up condition (e.g., due to a channel change or a fast forward/rewind operation), where a priority is assigned for a ratio of LD to BE packets based upon such condition.

In a scenario in which 75% of the packets would be assigned or marked as LD packets and the remaining packets marked as BE packets, the video flow to the content receiver provided with this weighted advantage would experience only 25% of the packet drops during normal congestion within the network in relation to another content receiver that may have a value w=1 (e.g., a content receiver in steady-state mode with a full buffer, where all packets are marked as BE packets). The throughput rate, based upon the TCP throughput equation, is described as follows:

$$Rate \leq MSS/(SQRT(p)*RTT)$$

where MSS is maximum segment size, p is packet loss rate and RTT is round trip time. Based upon this well-known equation, a content receiver having only 25% packets marked as BE class will experience twice the throughput in relation to a content receiver having w=1 (i.e., all packets assigned BE class).

When network congestion is greater than normal, or other conditions occur that alter the priority of packet drops, the prioritization of packet drops associated with weight values can change such that a content receiver cannot rely solely upon knowledge of the priority value or advantage it has been assigned utilizing the WRED techniques as previously described herein. In other words, if a content receiver implements an adaptation scheme to achieve a quality level for content while also filling its buffer based solely upon an anticipated priority or advantage it should receive under normal operating conditions, the content receiver may experience issues that negatively affect user experience (e.g., buffer underrun) if the actual advantage is skewed from the anticipated advantage due to changes in network conditions.

Figure 5:
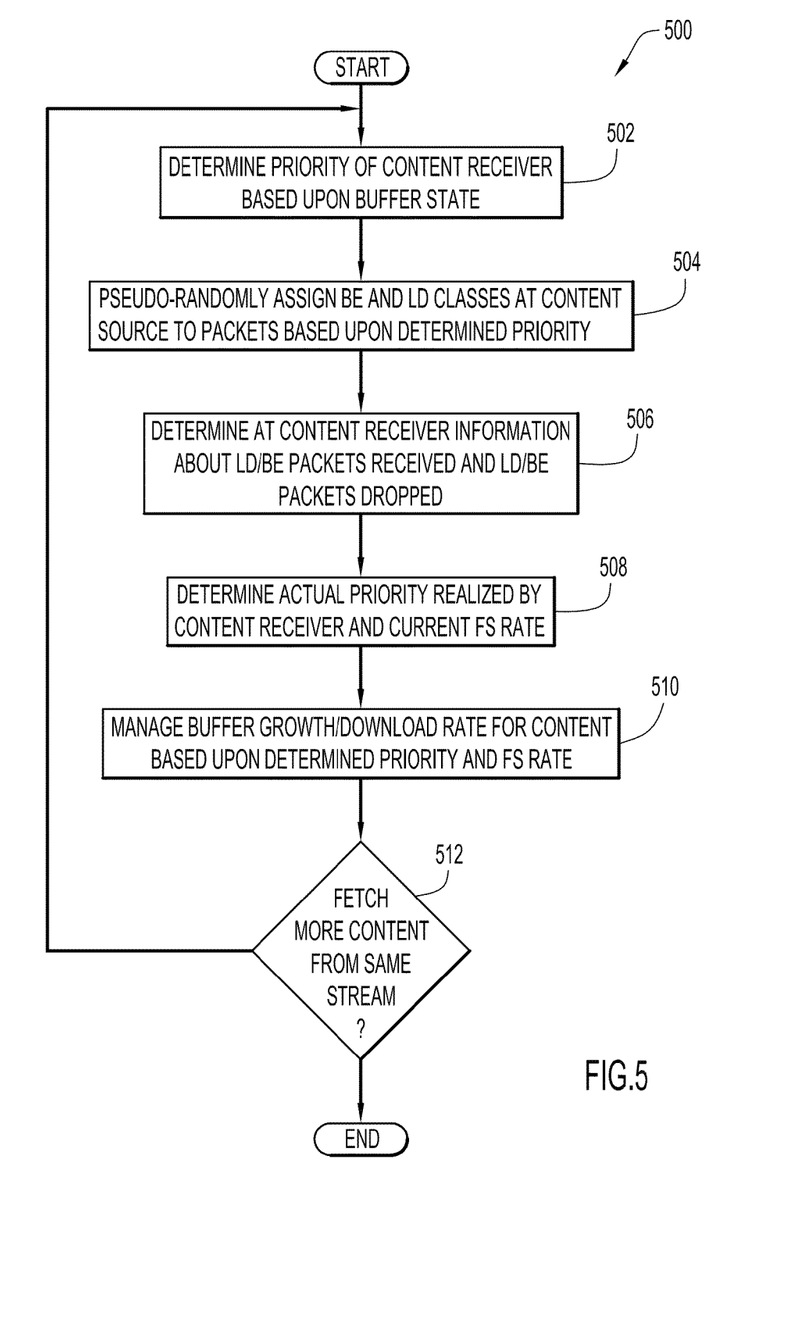
FIG. 5 is a simplified flowchart illustrating potential operations associated with the communication systems in accordance with an embodiment of the present disclosure.

An example embodiment of an advantage detection technique for determining actual priority and fair share rate for a content receiver at any given time during adaptive streaming of content within a network system, such as is depicted in FIG. 1A, is described with reference to the flow chart 500 of FIG. 5. At 502, a priority for a content receiver (e.g., content receiver 18a) is determined based upon a buffer fullness, where a weight value "w" is assigned accordingly. For example, as previously noted, a buffer monitor module 28 of a content receiver 18a provides information about buffer fullness to a content source 12 (the content source providing content to the content receiver), and the content source, using content delivery module 32, determines a corresponding priority as a weight value.

At 504, the content source 12 pseudo-randomly assigns BE or LD classes to packets in accordance with a priority value (e.g., as determined by the weight value "w" or any other suitable criteria) for the content receiver requesting content (e.g., based upon the buffer fullness at the time a request for the next content segment is requested). However, without any additional information being provided to the content receiver 18a, there is no way for the content receiver to know whether a packet that was dropped and thus never received was marked as a BE packet or a LD packet. For example, if the network is operating under normal congestion with no misconfigurations or other conditions that may affect assigned priorities, the only packets that should be dropped are BE packets, such that content receivers with a greater advantage than other content receivers will likely have fewer BE packets assigned to their content flows and thus will likely have a smaller packet loss rate. However, if there is a significant non-WRED bottleneck or congestion within the network or some other condition occurs, LD packets might be dropped or packets might not be assigned as BE or LD in accordance with a ratio corresponding to the weight values or priority assigned to content receivers, and certain content receivers may lack an awareness or appreciation of whether and to what extent an anticipated throughput advantage has diminished due to the condition. Alternatively, if the network is not currently under congestion, no BE or LD packets might be dropped and, again, the receiver might not obtain as much network advantage as it expects.

Packets are marked in a "pseudo-random" manner in that the content receiver is provided with certain necessary information to determine whether a dropped packet that was never received was actually marked as BE or LD. In other words, while each packet was marked in a manner that is free of obvious repetitions, sequences, etc., the content receiver can access information that allows the content receiver to identify the randomly generated marking without having received the packet. Furthermore, even in a case where the network may be configured to change the markings on the packets before the packets reach the content receiver, the content receiver is able to determine the original marking (BE or LD) that should have been applied to the packet by the sender. This can be achieved in the following manner.

At 506, the content receiver 18a (utilizing DSCP detection module 31) determines information about BE and LD packets received and also BE and LD packets dropped by monitoring information generated in its TCP receiver stack. The content receiver and content source are configured such that the packets are marked as BE or LD in a pseudo-random manner that is also deterministically re-computable by the content receiver. One way of doing this is to utilize a hash function that takes as input packet flow information, TCP sequence number and/or any other suitable information that is provided in the network header of a packet and outputs a hash value which is a real number between 0 and 1. This hash value is then compared against the weight (w) assigned to the segment, and the packet is marked as BE if the hash value is less than or equal to w, and is marked as LD if the hash value is greater than w. The content source 12, utilizing the content delivery module 32 and the hash function as well as network header information associated with the packet, assigns a 0 (BE) or a 1 (LD) to a packet based upon network header information associated with the packet. While the marking of a packet as BE or LD appears random due to the hash function, the content receiver 18a (utilizing DSCP detection module 31) can discover whether a dropped packet was a BE packet or LD packet based upon the TCP header information associated with the dropped packet and knowledge of the hash function. Furthermore, even if the DSCP marking is changed by the network while the packet is in transit from the content source to the content receiver, the content receiver can determine the DSCP marking that was originally assigned to the packet.

The content receiver obtains information, utilizing DSCP detection module 31, regarding the number of BE and LD packets that are received at each code point as well as the number of BE and LD packet drops at each code point. This information can be gathered by the DSCP detection module 31 by adding two arrays of 64 counters (one per code point) per TCP socket. One array counts the number of packets received per code point, and the other array counts the number of estimated drops per code point. The number of each type of packet received (BE or LD) can be determined by the DSCP detection module 31 when each packet is received. In counting the packets received and the packets dropped at each DSCP code point, the content receiver may rely on the actual DSCP values of received packets and infer the DSCP code points of dropped packets based on knowledge of the hash function or, in cases where the network may change the DSCP code point of packets in flight, it may infer the original DSCP marking of packets that were received as well as packets that were dropped and use these inferred DSCP markings in maintaining the counters.

The DSCP detection module 31 can detect whether dropped packets (packets not received) are BE or LD packets in the following manner. In TCP, a packet is assumed to be lost if the sender of content (e.g., content server) receives three duplicate acknowledgements from a content receiver that correspond to the same TCP sequence number (where the content receiver sends duplicate ACK messages if a TCP segment in the content stream is missing). In the techniques described herein, the DSCP detection module 31 at the content receiver 18a can be configured to estimate the number of dropped packets by counting the number of triple duplicate acknowledgements (ACK messages) that are sent. For each dropped packet (identified by the triple duplicate acknowledgements sent by the content receiver), the content receiver (utilizing DSCP detection module 31) determines the code point assigned to the dropped packet using the hash function and increments the appropriate counter.

It is noted that, while the example embodiment of pseudo-randomly marking packets with BE or LD values has been described as being made on a packet-by-packet basis, packets can also be pseudo-randomly marked in groups or clusters (e.g., a cluster of consecutive packets, where each packet in the cluster is marked as BE or LD). Thus, a pseudo-random marking is not limited to providing a uniform probability of marking a packet as LD or BE across the entire sequence number space of a TCP connection. In some embodiments, it may be preferable to permit the pseudo-random assignment function to generate clusters of packets marked as BE and/or LD most of the time, provided that the overall target ratio of LD and BE packets for a content receiver (based upon the weight or priority assigned to the content receiver) is maintained over a longer time period. This may be useful, for example, in situations where TCP transmit offload hardware is used on the content source, and sequences of TCP packets with a non-varying drop priority may be sent more efficiently than sequences of TCP packets where the drop probability changes from one packet to the next (i.e., on a packet-by-packet basis).

Based upon the information obtained by the DSCP detection module 31 in monitoring the TCP receiver stack, which includes information regarding number of BE and LD packets received and number of BE and LD packets dropped, the content receiver 18a can determine an actual priority realized and a current fair share (FS) rate at 508. In the normal case, the content receiver will observe packet losses from the BE packets and no packet losses among the LD packets. In this case, the actual priority is as follows:

$$\text{Priority} = \text{SQRT}((\text{LD}_{Packets} + \text{BE}_{Packets})/\text{BE}_{Packets})$$

where $\text{LD}_{Packets}$ is the total number of LD packets (received and dropped) and $\text{BE}_{Packets}$ is the total number of BE packets (received and dropped).

The network fair share rate (FS) for the content receiver is:

$$\text{FS} = (\text{Observed download rate})/\text{Priority}$$

The determined Priority and FS values allow the content receiver 18a to make decisions at 510, utilizing the stream state module 30, that adapt to the actual detected advantage provided to the content receiver at a given time while downloading content at the observed download rate (FS*Priority). This allows the content receiver to adapt to a quality level that minimizes overshoot and undershoot when changing the degree of advantage in its requests and thus improves stability. The priority bandwidth can be used by the content receiver to grow the size of content within its buffer 22 while reducing the possibility of a rebuffering event.

At 512, if more content is to be fetched from the same content stream, the process steps 502-510 are repeated to update information associated with the content receiver relating to its buffer state and detected advantage and fair share after additional content is fetched.

The detected advantage allows the content receiver 18a to determine at any time whether it is actually receiving an assigned advantage based upon its priority by analyzing the number of LD and BE packets that are received and dropped. Based upon a knowledge of packets sent that are marked with LD and BE and also the drop rate of both LD and BE packets, the content receiver can determine what advantage is being realized at any given time and also how the packet drop rate may change due to a change in the ratio of LD to BE packets. By continuously monitoring the priority associated with the content receiver (based upon detection of the ratio of LD to BE packets sent to the content receiver), the content receiver can revise its adaptation scheme accordingly.

For example, if the network is not under any congestion, the content receiver can realize this since there will not be any dropped packets observed for either LD or BE class (e.g., no triple duplicate acknowledgement messages observed). This would allow the content receiver to adapt accordingly using the traditional logic (i.e., no observed advantage) in an effort to manage buffer growth while displaying video at a selected quality level. If the network is misconfigured or the WRED priority techniques are not configured at a current bottleneck within the network, this can also be detected by the content receiver 18a based upon a detection of LD and BE packets both received and dropped, where there is no difference in observed drop rates between the two classes (or the observed drop rate difference does not correspond with the advantage assigned to the content receiver based upon the WRED techniques). The content receiver can again use this information to decide to use a traditional logic adaptation (i.e., if there is no observed advantage) in relation to managing the buffer and also video quality. If packets are getting re-marked within the network and downstream from the bottleneck, the different drop ratio between LD and BE packets can still be observed at the content receiver, and the content receiver can adapt accordingly (e.g., utilizing adaptation logic based upon an observed advantage, or using traditional adaptation logic if no observed advantage). If the content source is misconfigured, the content receiver might observe packets in an unexpected code point or at a different drop differential for LD and BE packets, and the content receiver can again act accordingly (e.g., opting to utilize the traditional adaptation logic if there is no observed advantage or the magnitude of the advantage is less than anticipated based upon the WRED prioritization techniques).

While certain system misconfigurations that are different may result in the same observed outcome at the content receiver, the content receiver can still adjust its adaptation logic accordingly based upon the observed outcome. Thus, the advantage detection techniques described herein need not diagnose a specific problem or misconfiguration over the network. The advantage detection techniques simply observe whether the content receiver is receiving an advantage as well as the magnitude of any such advantage at any given time during adaptive streaming of content from the content source.

Adaptation logic applied by the client/content receiver can be simplified using the advantage detection techniques described herein. Typical adaptation implementations at the client include heuristics for managing buffer growth during the buffer-filling mode. Traditional clients can elect to fetch an encoding rate that is lower than the estimated fair share (FS) network bandwidth in order to use the excess bandwidth to fill its buffer or, alternatively, sacrifice fast video playback in order to build a buffer without displaying video. By providing the client with logic that implements advantage techniques as described herein, the client is able to accurately measure fair share bandwidth while being granted a network advantage, thus allowing the client to fetch an encoding rate commensurate with its fair share while using the excess bandwidth it has been granted based upon its assigned priority to build its buffer. Thus, the client can present fair-share quality video without waiting as long as would otherwise be required for the buffer to grow to a safe level. This results in the client providing a faster channel change or content playout re-position at the same quality in relation to a client that implements traditional adaptation logic without the use of advantage detection techniques. Alternatively, the client can present higher-quality content while achieving the same channel change time with respect to a client utilizing a traditional adaptation logic.

While the advantage detection techniques have been described herein as being applied on the client side (i.e., the content receiver observes any realized advantage and the magnitude of such advantage), it is noted that the advantage detection logic can also be applied on the server side. For example, the content source can also be configured with suitable logic to monitor drop differential in BE/LD packets and communicate this information to the content receiver via a suitable signaling protocol. Advantage detection techniques could also be implemented using other mechanisms for notifying the client of network congestion besides packet drops, such as utilizing Explicit Congestion Notification (ECN) (where packets are marked with a Congestion Encountered or CE indication when there is congestion within the network).

As identified previously, a network element can include software (e.g., buffer monitor module 28, stream state module 30, and content delivery module 32, etc.) to achieve the adaptive streaming operations, as described herein. In certain example implementations, the adaptive streaming functions described herein may be implemented by logic encoded in one or more tangible media (e.g., embedded logic provided in an application specific integrated circuit (ASIC), digital signal processor (DSP) instructions, software (potentially inclusive of object code and source code) to be executed by a processor (processors 24a and 24b shown in FIGS. 1B and 1C, or other similar machine, etc.). In some of these instances, a memory element (memory 26a and 26b shown in FIGS. 1B and 1C) can store data used for the operations described herein. This includes the memory element being able to store instructions (e.g., software, code, etc.) that are executed to carry out the activities described in this Specification. The processor (e.g., processors 24a and 24b) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the caching of data streams as outlined herein. Additionally, each of these devices may include a processor that can execute software or an algorithm to perform the caching management activities as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

It should also be noted that many of the previous discussions may imply a single client-server relationship. In reality, there are "n" servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method comprising:
   receiving content within a network at a content receiver that is communicated from a content source, wherein the content comprises packets to be sent to the content receiver that are marked with a first drop priority or a second drop priority; and
   detecting a network priority at the content receiver that is based at least in part upon a ratio of packets marked with the first drop priority to packets marked with the second drop priority within the content and also a determination at the content receiver of a rate of packets dropped that are marked with the first drop priority and a rate of packets dropped that are marked with the second drop priority.

2. The method of claim 1, further comprising:
   communicating by the content receiver fetch requests for the content from the content source, wherein the content is communicated from the content source to the content receiver based upon the fetch requests.

3. The method of claim 2, wherein the fetch requests are initially based upon a first adaptation logic scheme to fill a buffer of the content receiver at a selected rate and to download segments of content at selected encoding rates, and the method further comprises:
   revising fetch requests for content in response to detection of the network priority, wherein the revised fetch requests are based upon a priority adaptation logic scheme that results in at least one of filling the buffer at a faster rate and downloading segments of content at higher encoding rates in relation to the first adaptation logic scheme.

4. The method of claim 3, further comprising:
continuously monitoring, at the content receiver, any change in network priority; and
revising the priority adaptation logic scheme in response to any change in the network priority.

5. The method of claim 1, wherein the marking of packets comprises
pseudo-randomly marking packets with the first drop priority or the second drop priority utilizing a hash function that is weighted based upon a weight value provided by the content receiver.

6. The method of claim 5, wherein the weight value represents a buffer state of the content receiver.

7. The method of claim 5, wherein the pseudo-random marking of packets further comprises, for each packet:
inputting header information for the packet into the hash function that generates a pseudo-random output value; and
marking the packet with the first drop priority or the second drop priority based upon a comparison of the output value from the hash function with the weight value provided by the content receiver.

8. The method of claim 1, further comprising:
identifying, at the content receiver, packets that have been dropped and whether dropped packets are marked with the first drop priority or the second drop priority.

9. The method of claim 8, wherein any packet associated with triple duplicate acknowledgements sent by the content receiver is identified at the content receiver as a dropped packet.

10. The method of claim 9, where the packet header of each packet includes DSCP (Differentiated Services Code Point) values associated with the packet, the method further comprising:
in a first array stored at the content receiver, counting a number of packets with first and second drop priorities received for each code point; and
in a second array stored at the content receiver, counting a number of packets determined as dropped for each code point.

11. The method of claim 1, wherein the marking of packets comprises:
pseudo-randomly marking packets in clusters utilizing a hash function that is weighted based upon a weight value provided by the content receiver, where each cluster includes a plurality packets marked with the first drop priority or the second drop priority.

12. An apparatus comprising:
a memory element configured to store instructions;
a buffer to store content; and
a processor configured to execute and control operations of the instructions so as to:
receive content that is communicated from a content source over a network, wherein the content comprises packets to be sent to the apparatus that are marked with a first drop priority or a second drop priority; and
detect a network priority that is based at least in part upon a ratio of packets marked with the first drop priority to packets marked with the second drop priority within the content and also a determination of a rate of packets dropped that are marked with the first drop priority and a rate of packets dropped that are marked with the second drop priority.

13. The apparatus of claim 12, wherein packets to be sent to the apparatus are pseudo-randomly marked with the first drop priority or the second drop priority utilizing a random function that is weighted based upon a weight value provided by the apparatus, wherein the weight value represents a state of the buffer.

14. The apparatus of claim 13, wherein each packet is pseudo-randomly marked by inputting header information for the packet into a hash function that generates a random output value, and marking the packet with the first drop priority or the second drop priority based upon a comparison of the output value from the hash function with the weight value provided by the apparatus, and the processor is further configured to execute and control operations of the instructions so as to:
identify packets that have been dropped and whether dropped packets are marked with the first drop priority or the second drop priority.

15. One or more computer readable storage devices encoded with software comprising computer executable instructions and when the software is executed operable to:
receive content within a network at a content receiver that is communicated from a content source, wherein the content comprises packets to be sent to the content receiver that are marked with a first drop priority or a second drop priority; and
detect a network priority at the content receiver that is based at least in part upon a ratio of packets marked with the first drop priority to packets marked with the second drop priority within the content and also a determination at the content receiver of a rate of packets dropped that are marked with the first drop priority and a rate of packets dropped that are marked with the second drop priority.

16. The one or more computer readable storage devices of claim 15, wherein the instructions are operable to mark packets by:
pseudo-randomly marking packets with the first drop priority or the second drop priority utilizing a random function that is weighted based upon a weight value assigned to the content receiver, wherein the weight value represents a buffer state of the content receiver.

17. The one or more computer readable storage devices of claim 16, wherein packets to be sent to the content receiver are marked so as to pseudo-randomly mark each packet by:
inputting header information for the packet into a hash function that generates a pseudo-random output value; and
marking the packet with the first drop priority or the second drop priority based upon a comparison of the output value from the hash function with the weight value provided by the content receiver.

18. The or more computer readable storage devices of claim 17, wherein the instructions are further operable to:
identify, at the content receiver, packets that have been dropped and whether dropped packets are marked with the first drop priority or the second drop priority.

19. The or more computer readable storage devices of claim 15, wherein packets to be sent to the content receiver are marked so as to pseudo-randomly mark packets in clusters utilizing a hash function that is weighted based upon a weight value provided by the content receiver, where each cluster includes a plurality packets marked with the first drop priority or the second drop priority.

20. The one or more computer readable storage devices of claim 15, wherein the instructions are further operable to:
communicate fetch requests by the content receiver for the content from the content source, wherein the content is communicated from the content source to the content receiver based upon the fetch requests, and the fetch requests are initially based upon a first adaptation logic scheme to fill a buffer of the content receiver at a selected rate and to download segments of content at selected encoding rates; and
revise fetch requests for content in response to detection of the network priority, wherein the revised fetch requests are based upon a priority adaptation logic scheme that results in at least one of filling the buffer at a faster rate and downloading segments of content at higher encoding rates in relation to the first adaptation logic scheme.

* * * * *